United States Patent [19]

Itoh et al.

[11] 3,997,497
[45] Dec. 14, 1976

[54] ROOM TEMPERATURE-CURABLE ORGANOPOLYSILOXANE COMPOSITIONS

[75] Inventors: Kunio Itoh, Annaka; Tamio Sato, Takasaki, both of Japan

[73] Assignee: Shin-Etsu Chemical Co., Ltd., Tokyo, Japan

[22] Filed: Aug. 22, 1975

[21] Appl. No.: 606,977

[30] Foreign Application Priority Data

Aug. 30, 1974  Japan .............................. 49-99766

[52] U.S. Cl. .................... 260/46.5 G; 260/46.5 UA
[51] Int. Cl.$^2$ ....................................... C08G 77/04
[58] Field of Search ............... 260/46.5 UA, 46.5 G

*Primary Examiner*—Lewis T. Jacobs
*Attorney, Agent, or Firm*—Toren, McGeady and Stanger

[57] ABSTRACT

The organopolysiloxane compositions comprising an organopolysiloxane expressed by the general formula

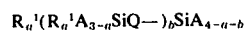

where $R^1$ is a monovalent hydrocarbon group, A is a diorganosiloxy group with a functional group at the chain end, Q is a divalent group and $a$ and $b$ are each 0 or 1, and an organosilane or an organopolysiloxane expressed by the general formula

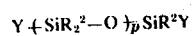 or

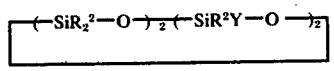

where $R^2$ is a monovalent hydrocarbon group, Y is a functional group and $p$ is an integer smaller than 11. The compositions are capable of curing at room temperature into a rubber-like elastomer with a very low modulus and a high elongation as high as 1400% or more.

19 Claims, No Drawings

ROOM TEMPERATURE-CURABLE ORGANOPOLYSILOXANE COMPOSITIONS

FIELD OF THE INVENTION

This invention relates to an improved room temperature-curable organopolysiloxane composition capable of readily giving a silicone elastomer with a high elongation and a low modulus by being cured at room temperature.

DESCRIPTION OF THE PRIOR ART

In the prior art, several types of organopolysiloxane compositions are known which can cure at room temperature into rubber-like elastomers. Specifically, cured silicone elastomers with high elongation and low modulus are prepared by the combination of difunctional silanes or siloxanes and tri- or tetrafunctional silanes or siloxanes. With respect to the mechanism of crosslinking, they belong to an addition type (see U.S. Pat. No. 3,697,473) or a condensation type (see U.S. Pat. No. 3,766,127), both of which are widely employed in the organopolysiloxane compositions for sealing materials or other applications. In the preparation of the organopolysiloxane compositions of the prior art, however, difunctional or polyfunctional silanes or siloxanes with very high purity are required as the raw materials and the properties of the resulting elastomers are remarkably affected by even slightest variation in the formulation of the silanes or siloxanes necessitating very careful control in the blending ratio of the raw materials. Furthermore, the enhanced reactivity of those polyfunctional silanes or siloxanes often leads to the disadvantage of too early gellation of the compositions to give a sufficiently long working time.

OBJECTS OF THE INVENTION

The object of the present invention is to present an improved room temperature-curable organopolysiloxane composition capable of giving a silicone elastomer with a high elongation and a low modulus by being cured at room temperature.

SUMMARY OF THE INVENTION

The composition of the present invention comprises
a. an organopolysiloxane represented by the general formula $$R_n{}^1(R_n{}^1A_{3-n}SiO—)_bSiA_{4-a-b} \quad (I)$$

where $R^1$ is a substituted or unsubstituted monovalent hydrocarbon group, A is a diorganosiloxy group represented by the general formula

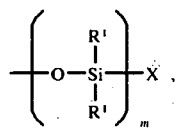

X being a hydrogen atom, a hydroxy group, a vinyl group or a hydrolyzable group and $m$ being a positive integer larger than 4, Q is a divalent atom or a group selected from the class consisting of an oxygen atom, an imino group, a divalent organic group and a diorganopolysiloxane group represented by the general formula

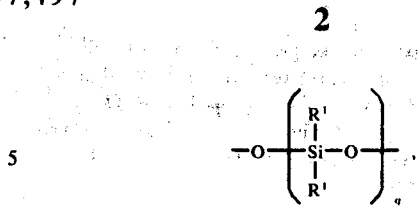

$q$ being a positive integer, and $a$ and $b$ are each 0 or 1, and b. an organosilane or an organopolysiloxane selected from the class consisting of the organosilanes or linear diorganopolysiloxanes represented by the general formula

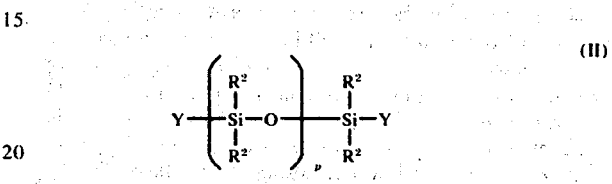

and the cyclic organopolysiloxanes represented by the general formula

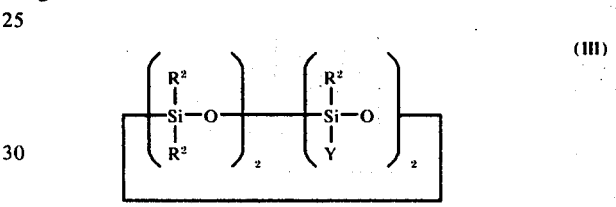

where $p$ is 0 or a positive integer smaller than 11, $R^2$ is a monovalent hydrocarbon group and Y is a vinyl group, a hydroxy or a hydrolyzable group, a hydrogen atom, or a hydroxy group, respectively when X is a hydrogen atom, a hydroxy group, a vinyl group, or a hydrolyzable group.

Part of component (a) above may be replaced with a linear diorganopolysiloxane represented by the general formula

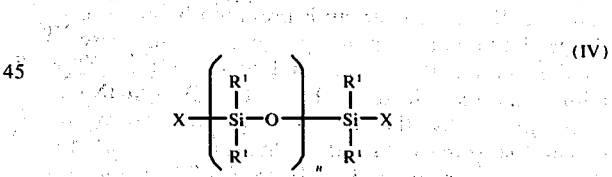

where $n$ is a positive integer larger than 4.

The organopolysiloxane compositions as specified above readily cure at room temperature into rubber-like elastomers with a high elongation and a low modulus widely applicable as sealing materials, coating materials, potting materials, and the like.

DETAILED DESCRIPTION OF THE INVENTION

Component (a) in the compositions of the present invention is one or a mixture of the organosilanes or siloxanes represented by formula (I) partly replaced, optionally, with the linear diorganopolysiloxanes represented by formula (IV). In the formulas, $R^1$ is a substituted or unsubstituted monovalent hydrocarbon group exemplified by methyl, ethyl, propyl, vinyl, phenyl, trifluoropropyl and cyanopropyl groups, X is a hydrogen atom, a vinyl group, or a hydrolyzable group such as alkoxy groups and acyloxy groups and Q is a divalent atom or group such as an oxygen atom, imino, methylene, ethylene, phenylene, oxymethylene, oxyethylene, oxyphenylene, $-C_6H_4-CH_2-$, $C_6H_4-CH_2O-$, $-OCH_2-CH_2O$, $-O-C_6H_4-O-$, $-C_6H_4-CH_2$ $_6C_6H_4-$, $-CH_2-C_6H_4-CH_2-$, $-C_6H_4C-(CH_3)_2-C_6H_4-$, and

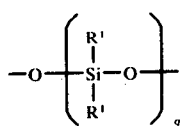

groups.

The method for the preparation of the organopolysiloxanes of formula (1) is well known. For example, the siloxanes where b is zero and X is a hydrolyzable group are prepared as follows. A silane represented by the general formula $R_a{}^1SiZ_{4-a}$ where $R^1$ and $a$ have the same meanings as above and Z is a hydrolyzable atom or group such as a halogen atom or an alkoxy group, and a cyclic organopolysiloxane represented by the general formula

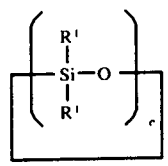

where $c$ is a positive integer larger than 2, are mixed together and subjected to the reaction with each other in the presence of an equilibration catalyst such as potassium hydroxide.

The hydrolyzable atoms or groups at the terminals of the organopolysiloxanes above obtained as oily products are converted into hydroxy groups by hydrolysis to give the organopolysiloxanes of formula (I) where X is a hydroxy group.

The organopolysiloxane of formula (I) where $b$ is zero and X is a vinyl group is prepared by neutralizing the product obtained above by equilibration, where Z is a halogen atom at each terminal, by use of a vinyl containing sodium silicate $(CH_2=CH)(CH_3)_2SiONa$ or, alternatively, by the reaction of the hydroxy-terminated siloxane obtained by hydrolysis and a vinylchlorosilane such as $(CH_2=CH)(CH_3)_2SiCl$ in the presence of pyridine as an acceptor for hydrogen chloride.

Several of the examples of the organopolysiloxanes of formula (I) where $b$ is zero and $a$ is 1 are as follows.

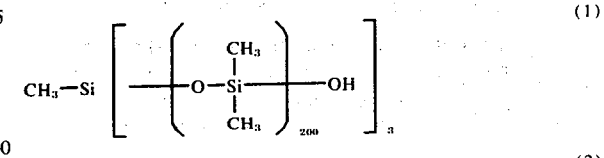

(1)

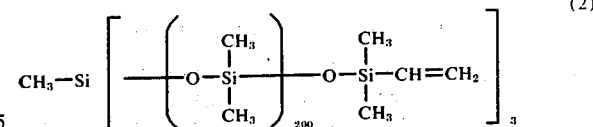

(2)

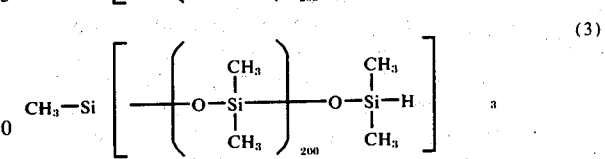

(3)

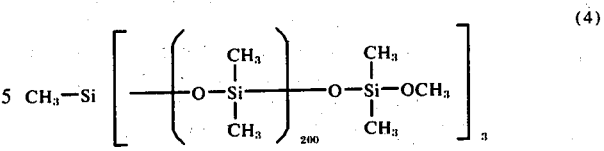

(4)

The organopolysiloxanes of formula (I) where $a$ and $b$ are each 1 are prepared as follows. For example, an organosilicon compound represented by the general formula

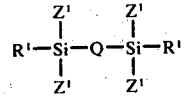

where $Z^1$ is a hydrolyzable atom or a groups such as chlorine atom and methoxy group and a cyclic organopolysiloxane represented by the general formula

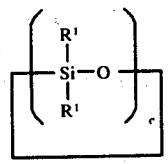

are subjected to the equilibration reaction similarly as above and the reaction product is then hydrolyzed. Several examples of such organopolysiloxanes are:

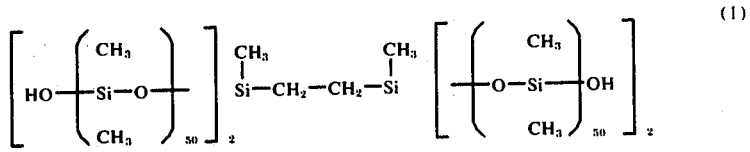

(1)

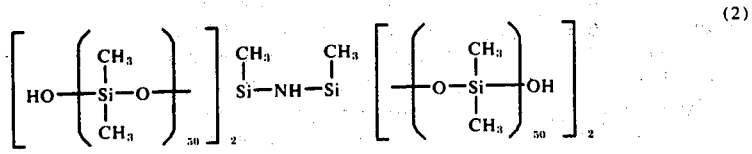

(2)

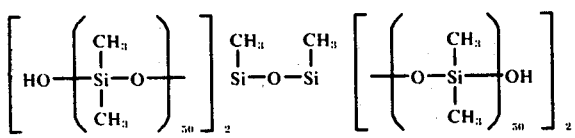

The method for the preparation of the linear diorganopolysiloxanes represented by formula (IV) is also known. For example, the organopolysiloxanes are prepared by the equilibration reaction of a silane represented by the general formula

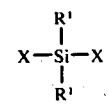

or a disiloxane represented by the general formula

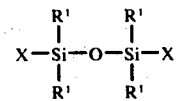

with a cyclic organopolysiloxane represented by the general formula

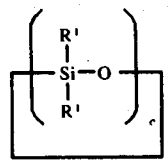

by the thermal cracking of a hydroxy-terminated diorganopolysiloxane with high degree of polymerization in the presence of water, or by the ring-opening polymerization of the cyclic organopolysiloxanes represented by the general formula above in the presence of water.

Several examples of the organopolysiloxanes of Formula (IV) are as follows.

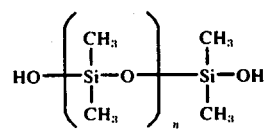

(1)

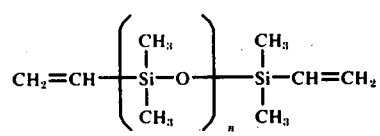

(2)

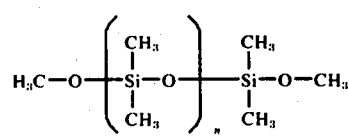

(3)

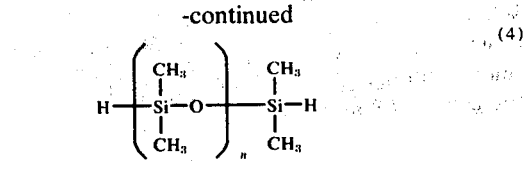

(4)

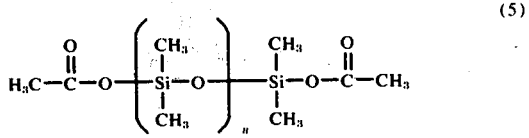

(5)

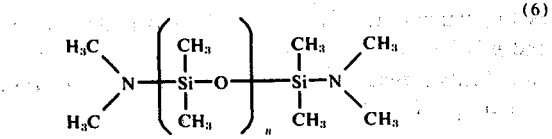

(6)

The viscosity of the organopolysiloxanes in component (a) is not limited. When component (a) is a mixture of two types of the organopolysiloxanes represented by formulas (I) and (IV), the content of the organopolysiloxane (I) in the mixture may be widely varied in accordance with the molecular structure of those organopolysiloxanes but it is preferred that the organopolysiloxane (I) is present in an amount at least 1% or, preferably, at least 3% of the total amount of component (a).

Component (b) in the composition of the present invention is a silane or siloxane represented by formula (II) or (III), in which $R^2$ is a monovalent hydrocarbon group, such as methyl, ethyl, propyl, vinyl and phenyl, preferably methyl or vinyl, groups, Y is a hydrogen atom, a hydroxy group, a vinyl group or a hydrolizable group, such as

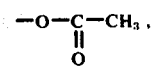

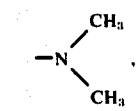

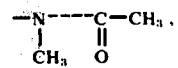

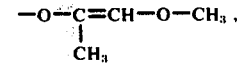

and

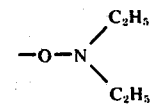

$p$ is 0 or a positive integer smaller than 11. In the composition of the present invention, specific combinations are required for the group X in component (a) and the group Y in component (b). Namely Y is a vinyl group, a hydroxy group or a hydrolyzable group, a hydrogen atom, or a hydrolyzable group, respectively, when X is a hydrogen atom, a hydroxy group, a vinyl group, or a hydrolyzable group.

Known methods are applicable for the preparation of the organopolysiloxanes represented by formula (II). When Y is a hydrolyzable group and $p$ is not zero, for example, the siloxane is readily prepared from a chlorineterminated diorganopolysiloxane represented by the general formula

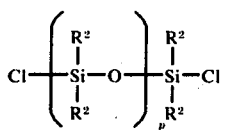

as the starting material. When Y is a hydrogen atom and $p$ is larger than 2, the siloxane is prepared by the equilibration reaction of the organopolysiloxane represented by the general formula

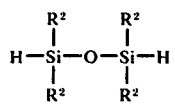

and a cyclic organopolysiloxane represented by the general formula

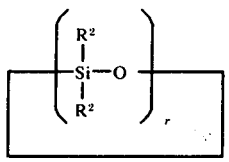

where $r$ is a positive integer larger than 2. Examples of the organopolysiloxanes represented by formula (II) are as follows.

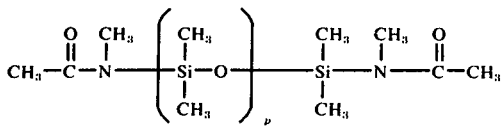
(1)

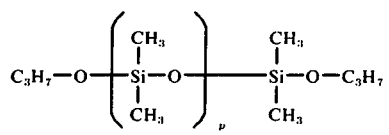
(2)

The cyclic organopolysiloxane represented by formula (III) is, when Y is a hydrogen atom, for example, prepared by the partial addition reaction of an olefinically unsaturated compound such as ethylene, propylene and 1-pentene to 1,3,5,7-tetramethylcyclotetrasiloxane. One of the examples of the organopolysiloxanes of formula (III) is:

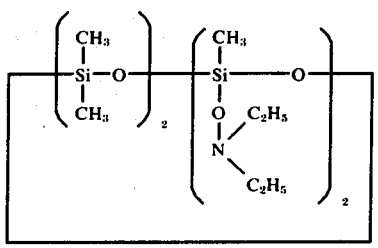

The ratio of components (a) and (b) to be formulated in the composition of the present invention is varied in a wide range depending upon the conditions such as the desired degree of cross-linking and the kinds of the functional groups denoted by the symbols X and Y, but preferably it is in such a range that more than 0.2 part by weight or, preferably, from 0.2 to 30 parts by weight of the component (b) is formulated per 100 parts by weight of component (a).

The organopolysiloxane composition of the present invention may be prepared by merely blending components (a) and (b) and the composition becomes readily cured into a rubber-like elastomer at a temperature between room temperature and about 100° C.

The curing velocity of the composition may be accelerated, if necessary, by the addition of a curing catalyst known in the prior art. Such a curing catalyst is selected in accordance with the combination of the functional groups X and Y. When the combination is a hydrogen atom directly bonded to a silicon atom and a vinyl group directly bonded to a silicon atom, the catalyst recommended is platinum or a platinum compound, while a metal salt of carboxylic acids or a metal acetylacetonate is employed as the catalyst when the combination of X and Y is a hydroxy group directly bonded to a silicon atom and a hydrolyzable group.

The platinum or platinum compound mentioned above is exemplified by platinum black, chloroplatinum acids, such as chloroplatinous acid and chloroplatinic acid, chloroplatinic acid modified with alcohols, aldehydes and ethers and the complexes of chlorolatinic acid with several kinds of olefins. The metal salts of carboxylic acids mentioned above are exemplified by stannic octoate, stannous octoate, lead acetate, dibutyltin diacetate and dibutyltin dioctoate. The metal acetylacetonates are further exemplified by cobalt acetylacetonate.

The amount of the curing catalyst to be employed is subject to adjustment in accordance with the conditions such as the kinds of the functional groups X and Y in the general formulas above and the desired curing velocity. Generally speaking, the catalyst of platinum or a platinum compound is employed in an amount between 5 and 500 p.p.m. based on the total amount of components (a) and (b) and the metal salt of a carboxylic acid or the metal acetylacetonate is employed in an amount between 0.1 and 2% by weight of the total amount of components (a) and (b).

It is optional that several kinds of additives may be added to the composition of the present invention including inorganic fillers, such as siliceous fillers exemplified by fine-powdered crystalline silica, fine-powdered amorphous silica, silica hydrogel (hydrated silicic acid), silica aerogel (anhydrous silicic acid), hydrated calcium silicate and hydrated aluminum silicate, metal oxides exemplified by titanium dioxide, aluminum oxide, zinc oxide and iron oxide, carbon black, graphite, calcium carbonate, mica and clay, fibrous fillers such as glass fiber, polyester fiber and nylon fiber, pigments, thermal-stability improvers and flame retardants.

The amounts of these additives may be varied insofar as no adverse effects are brought about to the properties of the resultant compositions.

The following examples illustrate the compositions of the present invention. In the examples, parts are all parts by weight.

EXAMPLE 1

A mixture of 1 mole of methyltrichlorosilane and 150 moles of octamethylcyclotetrasiloxane was heated as 40° C for 16 hours in the presence of 2% by weight of fuming sulfuric acid to give a methylpolysiloxane of branched structure terminated with chlorine atoms at the chain ends. The siloxane thus obtained was dissolved in equal amount of diethyl ether and the ether solution was dropped into three times by volume of water under agitation. After completion of dropping, the organic layer was separated, from which ether was distilled off followed by drying with anhydrous sodium sulfate and filtration. The product thus prepared was a methylpolysiloxane expressed by the formula

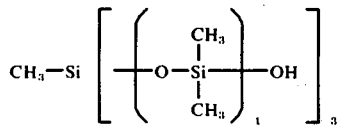

where $l$ is a positive number of about 200 in an average.

Into 100 parts of the above siloxane were added 0.8 part of bis(N-methylacetamido)methylvinyl silane expressed by the formula

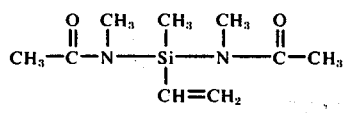

and 0.02 part of dibutyltin dilaurate and mixed uniformly into a composition. The composition became fully cured into a rubber-like elastomer after 7 days of standing at 25° C.

Alternatively, 10 parts of the same siloxane, 90 parts of α,ω-dihydroxydimethylpolysiloxane with a viscosity of 5,000 centistokes at 25° C and 15 parts of quartz powder with an average particle diameter of 5 μm were blended together into a pasty composition. Into 250 parts of the above pasty composition were added 4 parts of bis(N-methylacetamido)methylvinyl silane as described above and 0.65 part of dibutyltin dilaurate and mixed uniformly. Thus obtained composition became fully cured after 7 days of standing at 25° C into a cured body with the properties of 760% of elongation, 5.8 kg/cm² of tensile strength and hardness 12 as measured by the JIS method.

EXAMPLE 2

Similarly as in the preceding example, a hydroxy-terminated siloxane expressed by the formula

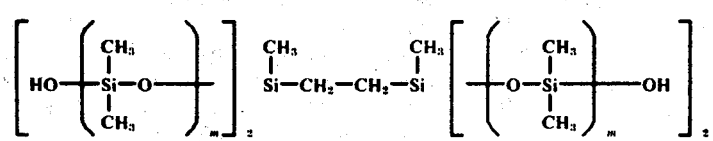

where $m$ is a positive number of about 50 in an average, was prepared from 1 mole of bis(methyldichlorosilyl)ethane expressed by the formula

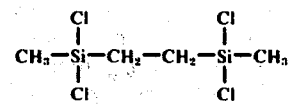

and 50 moles of octamethylcyclotetrasiloxane.

Into 100 parts of the siloxane above obtained was added 7 parts of a cyclic polysiloxane expressed by the formula

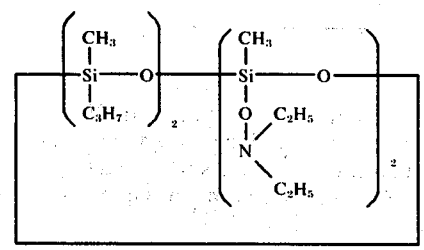

and the mixture was poured into a dish 10 mm deep. The mixture became fully cured into a rubber-like elastomer after 3 days of standing at room temperature.

Alternatively, 5 parts of the hydroxy-terminated siloxane obtained above, 95 parts of α,ω-dihydroxydimethylpolysiloxane with a viscosity of 3,000 centistokes at 25° C and 60 parts of calcium carbonate were blended uniformly with admixture of 3 parts of the same cyclic polysiloxane as above. The mixture became fully cured after 7 days of standing at room temperature to give a cured body with the properties of 605% of elongation, 7.5 kg/cm² of tensile strength and hardness 30 as measured by the JIS method.

Furthermore, 0.2 part of cobalt acetylacetonate was additionally added to the calcium carbonate-impregnated mixture above, which became fully cured after 3 days of standing at room temperature to give a cured body with the properties much the same as above.

EXAMPLE 3

Tris(dimethylvinylsiloxy)methyl silane expressed by the formula

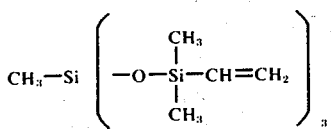

was obtained by the reaction of 2 moles of methyltrichlorosilane and 3 moles of 1,1,3,3-tetramethyl-1,3-divinyl disiloxane. A mixture of 1 mole of the siloxane obtained above and 150 moles of octamethylcyclotetrasiloxane was subjected to the equilibration reaction at 120° C for 10 hours in the presence of 0.02% by weight of potassium hydroxide to give a methylvinylpolysiloxane expressed by the formula

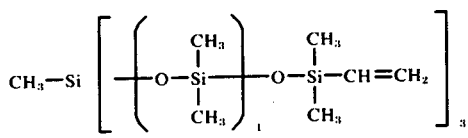

where $l$ is a positive number of about 200 in an average.

A mixture composed of 30 parts of the above siloxane, 70 parts of α,ω-dihydroxydimethylpolysiloxane with a viscosity of 1,500 centistokes at 25° C, 3.5 parts of a cyclic polysiloxane expressed by the formula

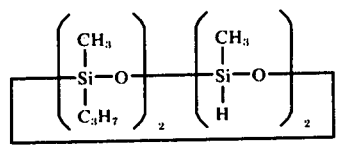

and 0.1 part of an isopropyl alcohol solution of chloroplatinic acid with a concentration of 2% by weight as platinum was kept standing at room temperature resulting in full curing after 2 days while heating of the mixture at 100° C resulted in the curing of the mixture to the same extent within 1 hour.

EXAMPLE 4

A methylpolysiloxane with a viscosity of 4,000 centistokes at 25° C, terminated with hydroxy groups at the chain ends and expressed by the formula

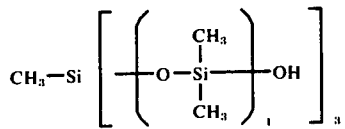

where $l$ is a positive number of about 200 in an average, was obtained by the reaction of 1 mole of tris(dimethylamino)methyl silane and 3 moles of α,ω-dihydroxydimethylpolysiloxane by heating the mixture of these reactants at 50° C for 30 hours.

A pasty composition was prepared by blending 100 parts of the siloxane obtained above, 18 parts of a dimethylpolysiloxane with a viscosity of 100 centistokes at 25° C terminated with hydroxy groups at both chain ends and 18 parts of Aerosil 972 (trademarks by DEGUSSA, West Germany).

Bis(N-methylacetamido)methylvinyl silane was admixed to the pasty composition above in an amount of 6 parts per 100 parts of the latter and the mixture was kept standing at room temperature for 3 days to be fully cured into a cured body with the properties of 385% of elongation, 22 kg/cm² of tensile strength and hardness 22 measured by the JIS method.

EXAMPLE 5

The siloxane with a viscosity of 4,000 centistokes at 25° C prepared in the same manner as in Example 4 was mixed with an α,ω-dihydroxydimethylpolysiloxane with a viscosity of 5,000 centistokes at 25° C in the ratios shown in Table 1 below under Expt. Nos. 1, 2 and 3.

To 100 parts of each of the above mixed siloxane were added 6.7 parts of calcium carbonate and 4.2 parts of a cyclic polysiloxane expressed by the formula

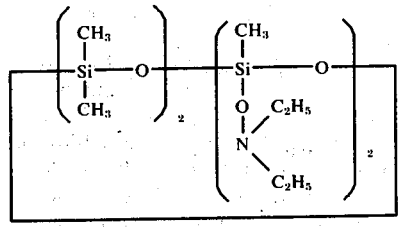

and the mixtures were kept standing at 25° C for 7 days to become cured bodies with the properties as shown in the table.

Table 1

| Expt. No. | | 1 | 2 | 3 |
|---|---|---|---|---|
| Siloxane of 4,000 cS, parts | | 5 | 10 | 15 |
| α,ω-Dihydroxydimethylpolysiloxane, parts | | 95 | 90 | 85 |
| Properties | Elongation, % | 1405 | 1285 | 1215 |
| | Tensile strength, kg/cm² | 9.5 | 11 | 11 |
| | Hardness | 12 | 14 | 12 |

EXAMPLE 6

A siloxane with a viscosity of 21,000 centistokes at 25° C expressed by the formula

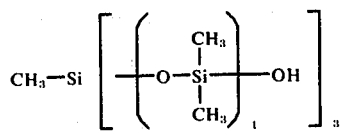

where $l$ is a positive number of about 200 in an average, was prepared by the reaction of 1 mole of tris(dimethylamino)methyl silane and 3 moles of an α,ω-dihydroxydimethylpolysiloxane with a viscosity of 700 centistokes at 25° C by heating the mixture of these reactants at 50° C for 30 hours.

Into 40 parts of the siloxane thus obtained were added an α,ω-dihydroxydimethylpolysiloxane with a viscosity of 5,000 centistokes at 25° C, calcium carbonate and bis(N-methylacetamido)methylvinyl silane each in the amounts shown in Table 2 below under Expt. No. 4 and 5, and the mixtures were kept standing at room temperature for 7 days to give cured bodies with the properties as shown in the table.

Table 2

| Expt. No. | | 4 | 5 |
|---|---|---|---|
| α,ω-Dihydroxydimethylpoly-siloxane, parts | | 160 | 60 |
| Calcium carbonate, parts | | 134 | 67 |
| Bis(N-methylacetamido)methyl silane, parts | | 16.6 | 8.3 |
| Properties | Elongation, % | 770 | 603 |
| | Tensile strength, kg/cm$^2$ | 5.7 | 4.6 |
| | Hardness | 10 | 16 |

EXAMPLE 7

A pasty composition was prepared by blending 50 parts of calcium carbonate with an average particle diameter of about 3 μm into a siloxane mixture composed of 20 parts of the siloxane prepared in the same manner as in Example 1 and expressed by the fromula

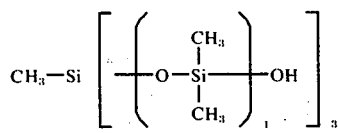

where 1 is a positive number of about 200 in an average, 30 parts of the siloxane prepared in the same manner as in Example 2 and expressed by the formula

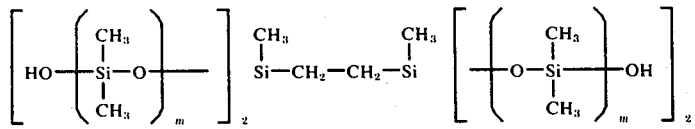

and 50 parts of α,ω-dihydroxydimethylpolysiloxane with a viscosity of 700 centistokes at 25° C by use of a three-roller mill. Into this pasty composition was further added 6 parts of bis(N-methylacetamido)-methylvinyl silane and the composition was kept standing at room temperature for 3 days resulting in a rubber-like elastomer with the properties of 320% of elongation, 21 kg/cm$^2$ of tensile strength and hardness 40 as measured by the JIS method.

The procedure described above was repeated to prepare another composition with 10 parts of a cyclic polysiloxane expressed by the formula

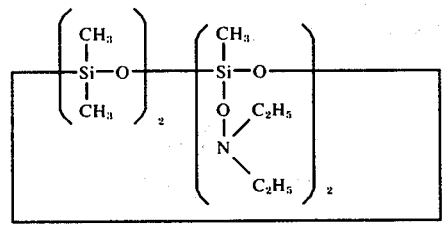

instead of 6 parts of bis(N-methylacetamido)methylvinyl silane resulting in a rubber-like elastomer with the properties of 450% of elongation, 15 kg/cm$^2$ of tensile strength and hardness 38 as measured by the JIS method.

Into each of the above two compositions was further added 0.5 part each of cobalt acetylacetonate. The resultant compositions became fully cured after 1 day at room temperature.

EXAMPLE 8

Into 100 parts of the reaction product obtained by the reaction of 1 mole of 1,3,3,5-tetramethyl-1,1,5,5-tetrachlorotrisiloxane and an α,ω-dimethoxydimethylpolysiloxane expressed by the formula

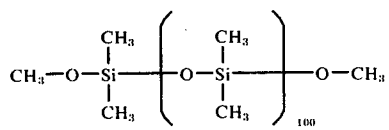

in the presence of ferric chloride was added 50 parts of water, 100 parts of isopropyl alcohol and 10 parts of acetic acid and the mixture was kept at 10° C for 10 hours under agitation resulting in a polysiloxane with 4 hydroxy groups in a molecule.

A mixture prepared by blending 100 parts of the polysiloxane obtained above, 8 parts of bis(propenoxy)methylvinyl silane and 1 part of dibutyltin dilaurate became fully cured into a rubber-like elastomer after 1 day of standing at room temperature.

Alternatively a mixture prepared by blending 50 parts of the polysiloxane obtained above, 50 parts of an α,ω-dihydroxydimethylpolysiloxane with a viscosity of 700 centistokes at 25° C, 5 parts of bis(propenoxy)methylvinyl silane and 1 part of dibutyltin dilaurate became cured into a rubber-like elastomer with low modulus after 7 days of standing at room temperature.

EXAMPLE 9

An organopolysiloxane expressed by the formula

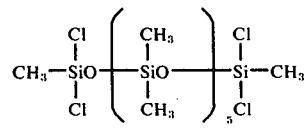

was prepared by subjecting a mixture consisting of 1 mole of dimethylpolysiloxane terminated with hydroxy groups at both ends and expressed by the formula

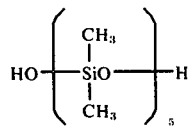

and 5 moles of trimethylchlorosilane to dehydrochlorination in the presence of pyridine.

One mole of the organopolysiloxane thus prepared was reacted with 5 moles of α,ω-dimethoxydimethylpolysiloxane expressed by the following formula.

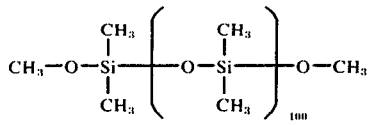

To 100 parts of the reactant were added 30 parts of toluene, 60 parts of isopropyl alcohol, 50 parts of water and 20 parts of acetic acid. The resulting mixture, after having been vigorously stirred at room temperature for 24 hours, was washed with isopropyl alcohol, removing low molecular weight siloxane ingredient, then subjected to treatment under a reduced pressure of 5 mmHg at 50° C, to produce a tetrafunctional organopolysiloxane.

To 100 parts of the tetrafunctional organopolysiloxane thus obtained were added 30 parts of Celite Superfloss (trademark owned by Johns-Manville), 5 parts of bis(propenoxy)methylvinyl silane and 1 part of dibutyltin dilaurate. The mixture became cured into a rubberlike elastomer having a low modulus after 24 hours of standing at room temperature.

Separately, to 30 parts of the same tetrafunctional organopolysiloxane was added 70 parts of a dimethylpolysiloxane terminated by hydroxy groups at both chain ends and having a viscosity of 1,000 centistokes at 25° C. To this mixture were added 5 parts of bis(-propenoxy)methylvinyl silane and 1 part of dibutyltin dilaurate, and the resulting mixture was allowed to stand at room temperature for 7 days, to produce a cured, low modulus rubber-like elastomer having the properties of 890% elongation and 12 kg/cm² of tensile strength.

EXAMPLE 10.

An organopolysiloxane expressed by the formula

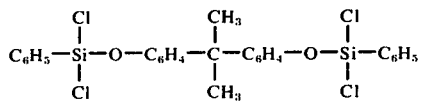

was prepared by the reaction of 1 mole of bisphenol A and 3 moles of phenyltrichlorosilane.

A mixture consisting of 1 mole of the organopolysiloxane thus prepared and 8 moles of an organopolysiloxane terminated with hydroxy groups at both chain ends and having a viscosity of 50 centistokes at 25° C was subjected to dehydrochlorination in the presence of triethylamine. The resulting mixture was washed with water to remove aminochloric acid, and then washed with isopropyl alcohol to remove low molecular weight siloxane ingredient. To 100 parts of the resulting viscous organopolysiloxane fluid was added 5 parts of the same cyclic polysiloxane as used in Example 2, and the mixture was allowed to stand at room temperature for 7 days, to produce a cured rubber-like elastomer.

Separately, to 20 parts of the organopolysiloxane prepared first above was added 80 parts of a diorganopolysiloxane composed of diphenyl siloxane and dimethylsiloxane units and expressed by the formula

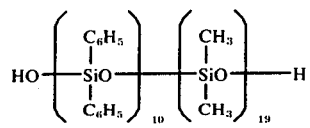

and the resulting mixture was further mixed with 5 parts of the same cyclic polysiloxane as used above and 30 parts of calcium carbonate, followed by well mixing. The resulting pasty product was allowed to stand at room temperature for 7 days to become a cured, low modulus rubber-like elastomer having an elongation of 650%.

What is claimed is:

1. A room-temperature curable organopolysiloxane composition comprising a. an organopolysiloxane represented by the general formula

where $R^1$ is a substituted or unsubstituted monovalent hydrocarbon group, A is a diorganosiloxy group represented by the general formula

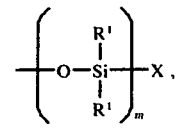

X being a hydrogen atom, a hydroxy group, a vinyl group or a hydrolyzable group and $m$ being a positive integer larger than 5, Q is a divalent group selected from the class consisting of an oxygen atom, an imino group, a divalent organic group and a diorganopolysiloxane group represented by the general formula

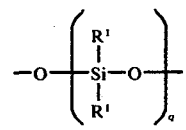

$q$ being a positive integer, and $a$ and $b$ are each 0 or 1, and b. an organosilane or an organopolysiloxane selected from the class consisting of organosilanes or linear diorganopolysiloxanes represented by the general formula

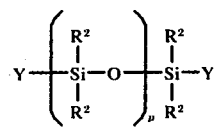

and cyclic organopolysiloxanes represented by the general formula

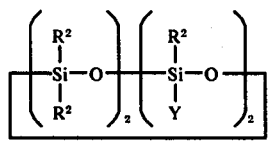

where $p$ is 0 or a positive integer smaller than 11, $R^2$ is a monovalent hydrocarbon group and Y is a vinyl group, a hydroxy or hydrolyzable group, a hydrogen atom or a hydroxy group, respectively when X is a hydrogen atom, a hydroxy group, a vinyl group or a hydrolyzable group.

2. A room-temperature curable organopolysiloxane composition comprising
c. a mixture of ($c_1$) an organopolysiloxane represented by the general formula

wherein $R^1$ is a substituted or unsubstituted monovalent hydrocarbon group, A is a diorganosiloxy group represented by the general formula

X being a hydrogen atom, a hydroxy group, a vinyl group or a hydrolyzable group and $m$ being a positive integer larger than 5, Q is a divalent atom or group selected from the class consisting of an oxygen atom, an imino group, a divalent organic group and a diorganopolysiloxane group represented by the general formula

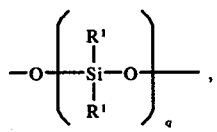

$q$ being a positive integer, and $a$ and $b$ are each 0 or 1 and ($c_2$) an organopolysiloxane represented by the general formula

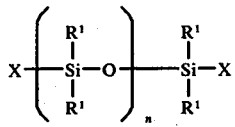

where $R^1$ and X have the same meanings as defined above and $n$ is a positive integer larger than 4, and
d. an organosilane or an organopolysiloxane selected from the class consisting of organosilanes or linear diorganopolysiloxanes represented by the general formula

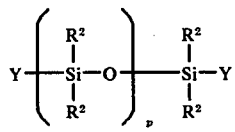

and cyclic organopolysiloxanes represented by the general formula

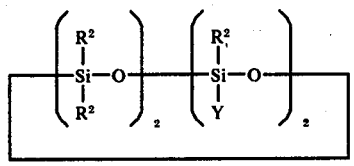

where $p$ is 0 or a positive integer smaller than 11, $R^2$ is a monovalent hydrocarbon group and Y is a vinyl group, a hydroxy or hydrolyzable group, a hydrogen atom or a hydroxy group, respectively when X is a hydrogen atom, a hydroxy group, a vinyl group or a hydrolyzable group.

3. The room-temperature curable organopolysiloxane composition as claimed in claim 1 wherein said substituted or unsubstituted monovalent hydrocarbon group represented by symbol $R^1$ is selected from the class consisting of methyl, ethyl, vinyl, phenyl, trifluoropropyl and cyanopropyl groups.

4. The room-temperature curable organopolysiloxane composition as claimed in claim 1 wherein said divalent organic group represented by symbol Q is selected from the class consisting of methylene, ethylene, phenylene, oxymethylene, oxyethylene, oxyphenylene, $-C_6H_4-CH_2-$, $-C_6H_4-CH_2O-$, $-OCH_2C_6H_4O-$, $-O-C_6H_4-O-$, $-C_6H_4-CH_2-C_6H_4-$, $-CH_2-C_6H_4-CH_2-$, and $-C_6H_4-C(CH_3)_2-C_6H_4-$.

5. The room-temperature curable organopolysiloxane composition as claimed in claim 1 wherein said monovalent hydrocarbon group represented by symbol $R^2$ is selected from the class consisting of methyl, ethyl, propyl, and vinyl groups.

6. The room-temperature curable organopolysiloxane composition as claimed in claim 1 wherein said hydrolyzable group represented by symbol X is selected from the class consisting of methoxy, acetoxy, and dimethylamino groups.

7. The room-temperature curable organopolysiloxane composition as claimed in claim 1 wherein said hydrolyzable group represented by symbol Y is selected from the class consisting of acetoxy, dimethylamino, N-methylacetamido, propenoxy, methoxy, and diethylaminoxy groups.

8. The room-temperature curable organopolysiloxane composition as claimed in claim 1 comprising 100 parts by weight of said component (a) and from 0.2 to 30 parts by weight of said component (b).

9. The room-temperature curable organopolysiloxane composition as claimed in claim 1 additionally comprising platinum or a platinum compound as the catalyst when the combination of the groups represented by symbols X and Y is a combination of a hydrogen atom directly bonded to a silicon atom and a vinyl group directly bonded to a silicon atom.

10. The room-temperature curable organopolysiloxane composition as claimed in claim 1 additionally comprising a metal salt of a carboxylic acid or a metal acetylacetonate as the catalyst when the combination of the groups represented by symbols X and Y is a combination of a hydroxy group directly bonded to a silicon atom and a hydrolyzable group.

11. The room-temperature curable organopolysiloxane composition as claimed in claim 2 wherein said mixture (c) is composed of at least 1% by weight of the organopolysiloxane defined as ($c_1$) and at most 99% by weight of the organopolysiloxane defined as ($c_2$).

12. The room-temperature curable organopolysiloxane composition as claimed in claim 2 wherein said substituted or unsubstituted monovalent hydrocarbon group represented by symbol $R^1$ is selected from the class consisting of methyl, ethyl, vinyl, phenyl, trifluoropropyl, and cyanopropyl groups.

13. The room-temperature curable organopolysiloxane composition as claimed in claim 2 wherein said divalent organic group represented by symbol Q is selected from the class consisting of methylene, ethylene, phenylene, oxymethylene, oxyphenylene, oxyethylene, phenylenemethylene, oxyphenylenemethylene, $-OCH_2CH_2O-$, $-O-C_6H_4-O-$, $-C_6H_4-CH_2-C_6H_4-$, $-CH_2-C_6H_4-CH_2-$, and $-C_6H_4-C(CH_3)_2-C_6H_4-$.

14. The room-temperature curable organopolysiloxane composition as claimed in claim 2 wherein said monovalent hydrocarbon group represented by symbol $R^2$ is selected from the class consisting of methyl, ethyl, propyl, and vinyl groups.

15. The room-temperature curable organopolysiloxane composition as claimed in claim 2 wherein said hydrolyzable group represented by symbol X is selected from the class consisting of methoxy, acetoxy, and dimethylamino groups.

16. The room-temperature curable organopolysiloxane composition as claimed in claim 2 wherein said hydrolyzable group represented by symbol Y is selected from the class consisting of acetoxy, dimethylamino, N-methylacetoamino, propenoxy, methoxy, and diethylaminoxy groups.

17. The room-temperature curable organopolysiloxane composition as claimed in claim 2 comprising 100 parts by weight of said component (c) and from 0.2 to 30 parts by weight of said component (d).

18. The room-temperature curable organopolysiloxane composition as claimed in claim 2 additionally comprising platinum or a platinum compound as the catalyst when the combination of the groups represented by symbols X and Y is a combination of a hydrogen atom directly bonded to a silicon atom and a vinyl group directly bonded to a silicon atom.

19. The room-temperature curable organopolysiloxane composition as claimed in claim 2 additionally comprising a metal salt of a carboxylic acid or a metal acetylacetonate as the catalyst when the combination of the groups represented by symbols X and Y is a combination of a hydroxy group directly bonded to a silicon atom and a hydrolyzable group.

* * * * *